United States Patent
Tamayo et al.

(10) Patent No.: US 6,941,318 B1
(45) Date of Patent: Sep. 6, 2005

(54) UNIVERSAL TREE INTERPRETER FOR DATA MINING MODELS

(75) Inventors: Pablo Tamayo, Cambridge, MA (US); Gary Drescher, Cambridge, MA (US)

(73) Assignee: Oracle International Corporation, Redwood Shores, CA (US)

( * ) Notice: Subject to any disclaimer, the term of this patent is extended or adjusted under 35 U.S.C. 154(b) by 495 days.

(21) Appl. No.: 10/142,169

(22) Filed: May 10, 2002

(51) Int. Cl.[7] .............................................. G06F 17/30
(52) U.S. Cl. .................................................... 707/102
(58) Field of Search ........................... 707/2, 3, 6, 102, 707/104.1; 700/31; 345/400, 440; 706/45; 715/500

(56) References Cited

U.S. PATENT DOCUMENTS

| | | | |
|---|---|---|---|
| 6,182,058 B1 * | 1/2001 | Kohavi ........................ | 706/45 |
| 6,278,464 B1 * | 8/2001 | Kohavi et al. ............... | 345/440 |
| 6,301,579 B1 * | 10/2001 | Becker ........................ | 707/102 |
| 6,484,161 B1 * | 11/2002 | Chipalkatti et al. ............ | 707/3 |
| 2003/0033287 A1 * | 2/2003 | Shanahan et al. .............. | 707/3 |
| 2003/0069877 A1 * | 4/2003 | Grefenstette et al. .......... | 707/2 |

OTHER PUBLICATIONS

Saso Dzeroski et al. Multi-Relational Data Mining: An Introduction, Jul. 2003, ACM SIGKDD Explorations Newsletter, vol. 5 Issue 1, pp. 1-16.*

Qiang Ding, et al. Decision Tree Classificatioin of Spatial Data Streams Using Peano Count Trees, Mar. 2002, Proceedings of the 2002, ACM symposium on Applied Com., pp. 413-417.*

* cited by examiner

*Primary Examiner*—Diane D. Mizrahi
(74) *Attorney, Agent, or Firm*—Swidler Berlin LLP

(57) ABSTRACT

A method, system, and computer program product for generating a representation of a data mining model that improves the transparency of data mining models so as to be more easily interpretable by human users. The method comprises the steps of: receiving a dataset, generating a callable version of the data mining model, and generating a tree representing decisional logic of the data mining model using the dataset.

24 Claims, 7 Drawing Sheets

UNIVERSAL TREE INTERPRETER FOR DATA MINING MODELS

FIELD OF THE INVENTION

The present invention relates to a universal tree interpreter for data mining models that provides improved transparency of data mining models so as to be more easily interpretable by human users.

BACKGROUND OF THE INVENTION

Data mining is a technique by which hidden patterns may be found in a group of data. True data mining doesn't just change the presentation of data, but actually discovers previously unknown relationships among the data. Data mining is typically implemented as software in or in association with database systems. Data mining includes several major steps. First, data mining models are generated by based on one or more data analysis algorithms. Initially, the models are "untrained", but are "trained" by processing training data and generating information that defines the model. The generated information is then deployed for use in data mining, for example, by providing predictions of future behavior based on specific past behavior.

The form that the information that defines each model takes depends upon the particular data analysis algorithm upon which the model is based. For example, a model based upon a classification and regression tree (CART) algorithm typically takes the form of a tree of IF-THEN rules. An important property of models is transparency. Transparency describes the existence of high-level descriptions, such as rule sets, that allow a human user to understand the basis of the predictions made by a model. For example, models based on a CART algorithm are typically highly transparent because they provide rule sets that are easily interpretable. Models based on a K-nearest neighbor algorithm provide a less transparent model. In this case, the models may still be partially interpreted by looking at the actual nearest neighbor records. Models based on neural net algorithms are typically not transparent, as they provide little interpretable information about the bases for their predictions.

A need arises for a technique by which the transparency of data mining models may be improved so as to be more easily interpretable by human users.

SUMMARY OF THE INVENTION

The present invention includes a method, system, and computer program product for generating a representation of a data mining model that improves the transparency of data mining models so as to be more easily interpretable by human users. The method comprises the steps of receiving a dataset, generating a callable version of the data mining model, and generating a tree representing decisional logic of the data mining model using the dataset.

In one aspect of the present invention, the generating step comprises the steps of: creating a split and a node using output of the callable version of the data mining model on the dataset and on created data and for each node, repeating the step of creating a split and a node while there is at least a minimum number of data points of the dataset in the node.

In one aspect of the present invention, the creating step comprises the steps of: creating new data points based on a distribution of data in the dataset, determining class membership for the created data points using the callable version of the data mining model, determining a split location, refining the split location, and performing the split at the refined split location.

In one aspect of the present invention, the step of determining class membership for the created data points comprises the step of for each created datapoint, scoring the datapoint with the callable version of the model.

In one aspect of the present invention, the step of determining a split location comprises the step of looping over variables associated with both the dataset and the created data point and computing a splitting index. The splitting index may be a Gini index.

In one aspect of the present invention, the representation of decisional logic of the data mining model comprises a decision tree or a classification tree.

BRIEF DESCRIPTION OF THE DRAWINGS

The details of the present invention, both as to its structure and operation, can best be understood by referring to the accompanying drawings, in which like reference numbers and designations refer to like elements.

DETAILED DESCRIPTION OF THE INVENTION

The present invention is a universal tree interpreter that improves the transparency of data mining models so as to be more easily interpretable by human users.

Figure 1:
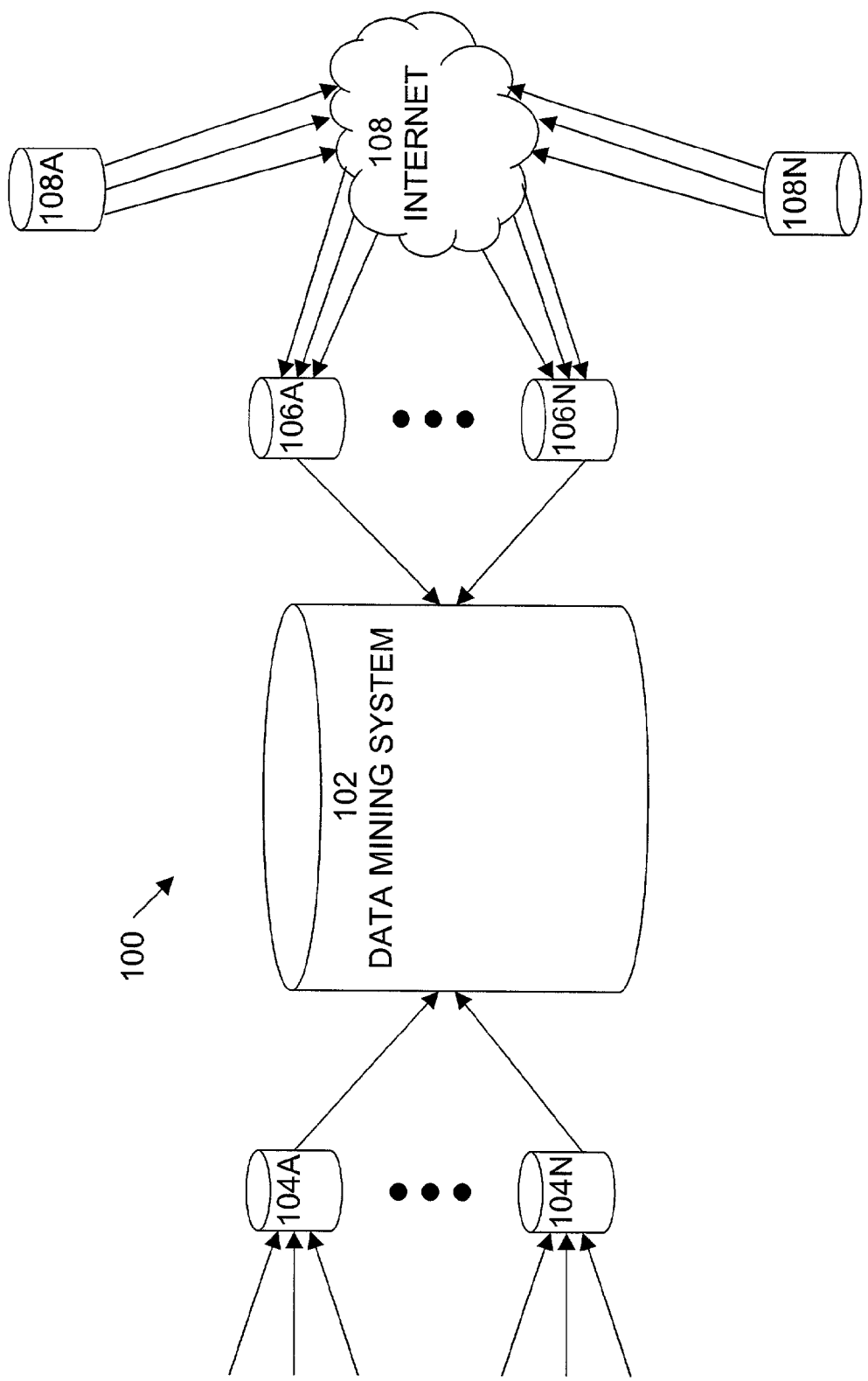
FIG. 1 is an exemplary block diagram of a data mining system, in which the present invention may be implemented.

An exemplary data mining system 100, in which the present invention may be implemented, is shown in FIG. 1. System 100 includes a data mining/data processing system 102 that is connected to a variety of sources of data. For example, system 102 may be connected to a plurality of internal or proprietary data sources, such as systems 104A–104N. Systems 104A–104N may be any type of data source, warehouse, or repository, including those that are not publicly accessible. Examples of such systems include inventory control systems, accounting systems, scheduling systems, etc. System 102 may also be connected to a plurality of proprietary data sources that are accessible in some way over the Internet 108. Such systems include systems 106A–106N, shown in FIG. 1. Systems 106A–106N may be publicly accessible over the Internet 108, they may be privately accessible using a secure connection technology, or they may be both publicly and privately accessible. System 102 may also be connected to other systems over the Internet 108. For example, system 110 may be privately accessible to system 102 over the Internet 108 using a secure connection, while system 112 may be publicly accessible over the Internet 108.

The common thread to the systems connected to system 102 is that the connected systems all are potential sources of data for system 102. The data involved may be of any type, from any original source, and in any format. System 102 has the capability to utilize and all such data that is available to it.

Figure 2:
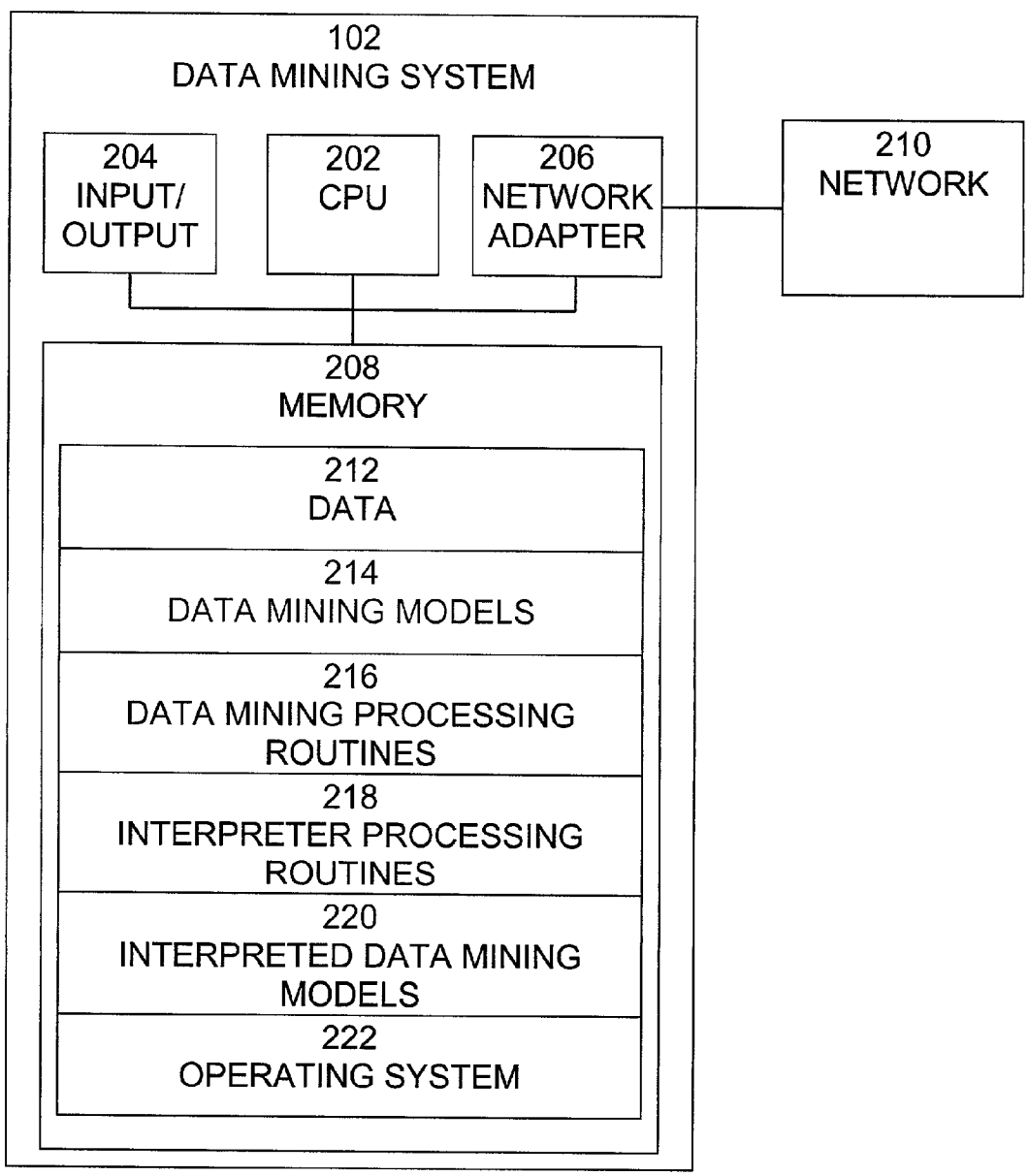
FIG. 2 is an exemplary block diagram of a data mining system, in which the present invention may be implemented.

An exemplary block diagram of a data mining system 102, shown in FIG. 1, is shown in FIG. 2. Data mining system 102 is typically a programmed general-purpose computer system or network of such systems, such as a personal computer, workstation, server system, and minicomputer or mainframe computer. Data mining system 102 includes processor (CPU) 202, input/output circuitry 204, network adapter 206, and memory 208. CPU 202 executes program instructions in order to carry out the functions of the present invention. Typically, CPU 202 is a microprocessor, such as an INTEL PENTIUM® processor, but may also be a minicomputer or mainframe computer processor. Input/output circuitry 204 provides the capability to input data to, or output data from, data mining system 102. For example, input/output circuitry may include input devices, such as keyboards, mice, touchpads, trackballs, scanners, etc., output devices, such as video adapters, monitors, printers, etc., and input/output devices, such as, modems, etc. Network adapter 206 interfaces data mining server 202 with network 210. Network 210 may be any standard local area network (LAN) or wide area network (WAN), such as Ethernet, Token Ring, the Internet, or a private or proprietary LAN/WAN.

Memory 208 stores program instructions that are executed by, and data that are used and processed by, CPU 202 to perform the functions of the database management system 102. Memory 208 may include electronic memory devices, such as random-access memory (RAM), read-only memory (ROM), programmable read-only memory (PROM), electrically erasable programmable read-only memory (EEPROM), flash memory, etc., and electromechanical memory, such as magnetic disk drives, tape drives, optical disk drives, etc., which may use an integrated drive electronics (IDE) interface, or a variation or enhancement thereof, such as enhanced IDE (EIDE) or ultra direct memory access (UDMA), or a small computer system interface (SCSI) based interface, or a variation or enhancement thereof, such as fast-SCSI, wide-SCSI, fast and wide-SCSI, etc, or a fiber channel-arbitrated loop (FC-AL) interface.

Memory 208 includes data 212, data mining models 214, data mining processing routines 216, universal tree interpreter processing routines 218, interpreted data mining models 220, and operating system 222. Data 212 includes the data that is to be mined by the data mining processes of data mining system 102. Typically, data 212 is arranged as a plurality of data table, as well as indexes and other structures that facilitate access to the data. Data mining models 214 include a plurality of any type of inductive and/or statistical data mining model, such as machine learning models, classification and regression tree models, K-nearest neighbor models, neural network models, naïve-Bayes models, etc. A model, in its conceptual form, is a group of definitions of patterns that may be found in a group of data. Data representing the conceptual form of a model may be stored in data mining models block 214. A model, in its deployed form, is typically a body of programming code that analyses the data input to it according to the conceptual model embodied by the code. The deployed form of model is typically used during operation of the data mining system to actually perform data mining. Deployed models may also be stored in data mining models block 214.

Data mining processing routines 216 include program code that generates untrained models, trains models using training data, generates deployed models from data representing conceptual models, analyzes data using the deployed models, and finds patterns and generates predictions and/or recommendations based on the data analysis. Interpreter processing routines 218 include program code that interpret data mining models to generate decision rules that embody the original data mining model. Interpreted data mining models 220 include these generated decision rules. Operating system 220 provides overall system functionality.

Figure 3:
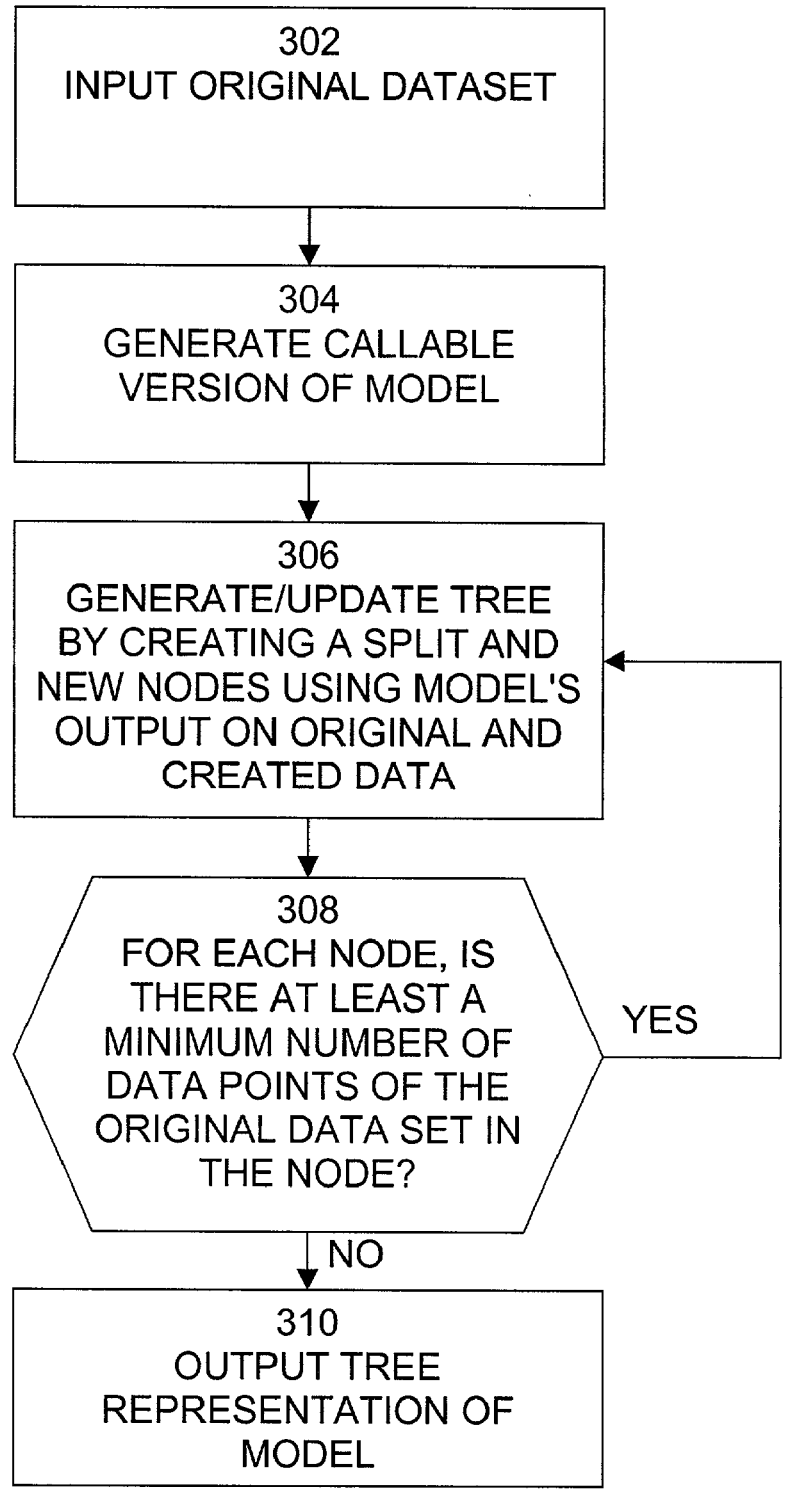
FIG. 3 is an exemplary flow diagram of an interpreted tree generation process that may be implemented in the system shown in FIG. 2.

A flow diagram of an interpreted tree generation process 300, which may be implemented in the system shown in FIG. 2, is shown in FIG. 3. The process begins with step 302, in which an original dataset is input to a callable model generation process. In step 304 a callable version of a data mining model is generated. The data mining model may be any standard data mining model, generated using any data mining algorithm. For example, the data mining model may be generated using any type of inductive and/or statistical data mining model, such as machine learning models, classification and regression tree models, K-nearest neighbor models, neural network models, naïve-Bayes models, etc. The data mining model may be in conceptual or in deployed form. In order to generate a callable version of the model, the model is encapsulated in a callable wrapper that allows the model to be directly called from other program code. If the model is in conceptual form, some transformation may be necessary in order to convert the model to callable form.

In step 306, a tree representing the data mining model is generated. This is done by creating a split and new nodes using the output of the callable version of the data mining model on the original input dataset and on data that is created thereafter. In step 308, it is determined whether, for each node generated in step 306, there is at least a minimum number of data points of the original dataset in the node. If, in step 308, it is determined that there is at least a minimum number of data points of the original dataset in the node, then the process loops back to step 306, in which the tree representing the data mining model is updated by creating a split and new nodes using the output of the callable version of the data mining model on the original input dataset and on data that is created thereafter.

If, in step 308, it is determined that there is not at least a minimum number of data points of the original dataset in the node, then the generation of the tree representation of the data mining model is completed and the process continues with step 310, in which the tree representation of the data mining model is output.

Figure 4:
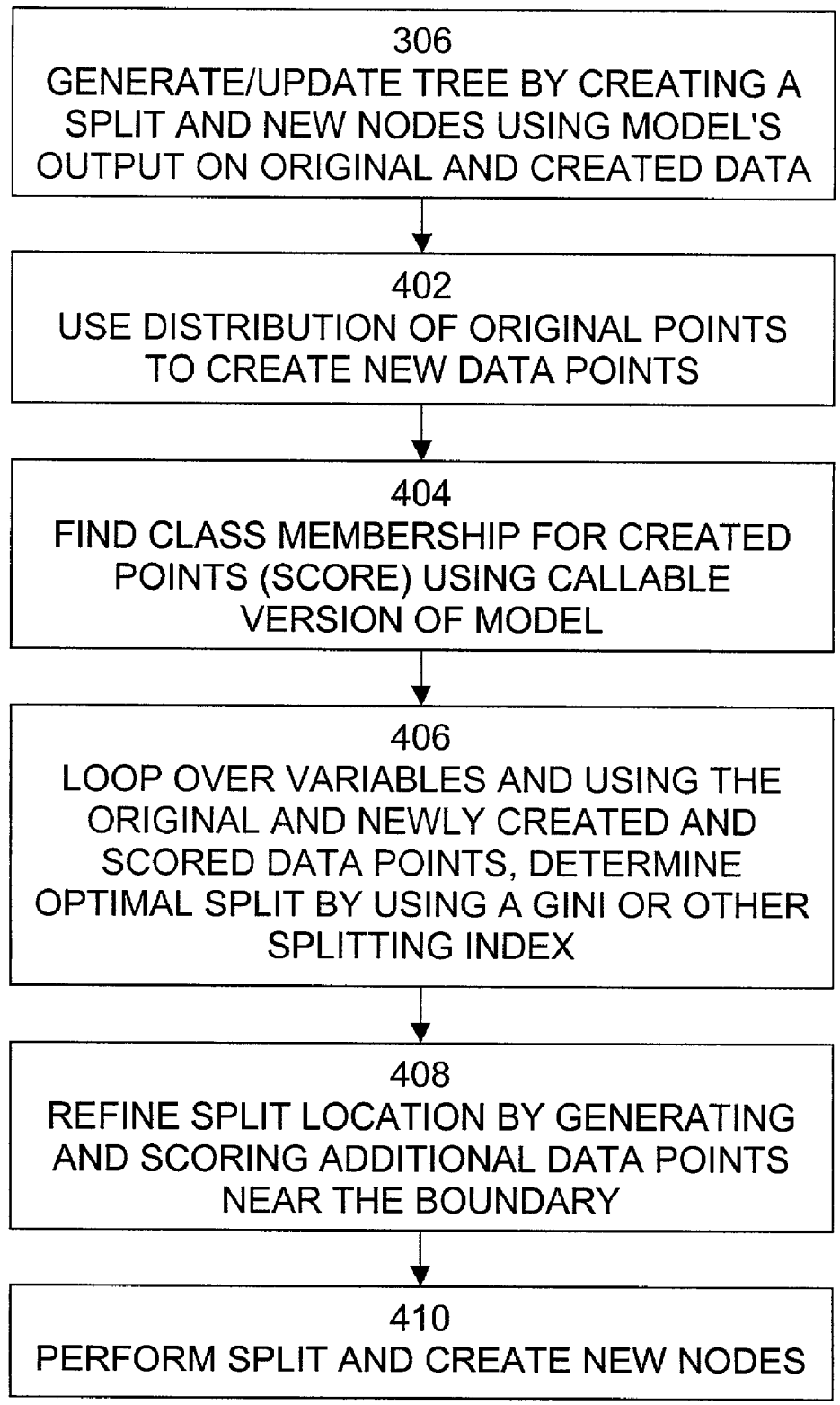
FIG. 4 is an exemplary data flow diagram of a step in the process shown in FIG. 3.

The sub-process of step 306, in which a tree representing the data mining model is generated or updated, is shown in more detail in FIG. 4. In step 402, the distribution of data points in the original dataset is used to create a new dataset including newly created data points. In step 404, the class membership for the created data points is determined using the callable version of the data mining model. The class membership of each created datapoint is determined by scoring the datapoint with the callable version of the model. In step 406, the optimal split is determined by looping over the variables associated with both the original dataset and the created dataset using a Gini index or other suitable splitting index. In step 408, the split location is refined be generating and scoring additional data points near the split boundary. In step 410, the split is performed at the refined split location and new nodes are created as a result.

Decision trees are an efficient form for representing decision processes for classifying patterns in data or piecewise constant functions in nonlinear regression. A tree functions in an hierarchical arrangement; data flowing "down" a tree encounters one decision at a time until a terminal node is reached. A particular variable enters the calculation only when it is required at a particular decision node and only one variable is used at each decision node. Moreover, a variable that is unimportant except for a special case can be used in that special case without impacting" the decisions in other cases. There are two types of simple binary decision trees: regression and classification. Regression trees are appropriate where the dependent variable is a ratio scale data type. In other words, if the dependent variable can assume any value over the range of observations, and if the differences are quantitative and consistent, then we want a model that can predict these values and one that is not constrained to particular members.

A classification tree is appropriate where the independent variable itself belongs to the data types nominal (named) or ordinal (ordered). Nominal data includes such variables as slope aspect: east, west, etc. Ordinal data exhibits relative, rather than quantitative differences. Interpretations of complex interactions are clearer and often more easily understood than other model constructions. A tree is far more easily interpreted by most people than mathematical expressions or nonlinear equations.

Classification trees are used to predict membership of cases or objects in the classes of a categorical dependent variable from their measurements on one or more predictor variables. The goal of classification trees is to predict or explain responses on a categorical dependent variable, and as such, the available techniques have much in common with the techniques used in the more traditional methods of Discriminant Analysis, Cluster Analysis, Nonparametric Statistics, and Nonlinear Estimation.

Binary decision trees or predictive tree classifiers take a vector of measurements x, ($x_m$,m 1,2, . . . ) of variables from the measurement space X of a result y and calculate the probabilities ($P_1$,$P_2$) that y is in each of the possible classes. The tree is constructed by repeated partitioning of subsets of X into two descendent subsets or nodes, where X itself is the root node and the partitions end in a set of terminal nodes. The terminal nodes are assigned a value based on the probabilities that they belong to a given class y. The partition or split at each node is made on the values in y conditionally on values in the sample vector x, based on a single variable in x. For ordinal or ratio scale data, splitting decisions are posed in the form: is $x_m$<c? where c is within the domain of $x_m$. For categorical variables, the decisions may be expressed as: is $x_m$ E 5 ?, where S includes all possible combinations of subsets of the categories defined in $x_m$.

The Gini index or coefficient is a summary measure of the deviation in the Lorenz curve. The Lorenz curve is a technique that is used to compare the distributions of two different variables. The Gini index is defined as $$G = 0.5 \sum_{i=1}^{n} |x_i - y_i|,$$

where n is the number of groups, and $x_i$ and $y_i$ are relative, not cumulative, frequencies for the x and y axis scales respectively.

Figure 5:
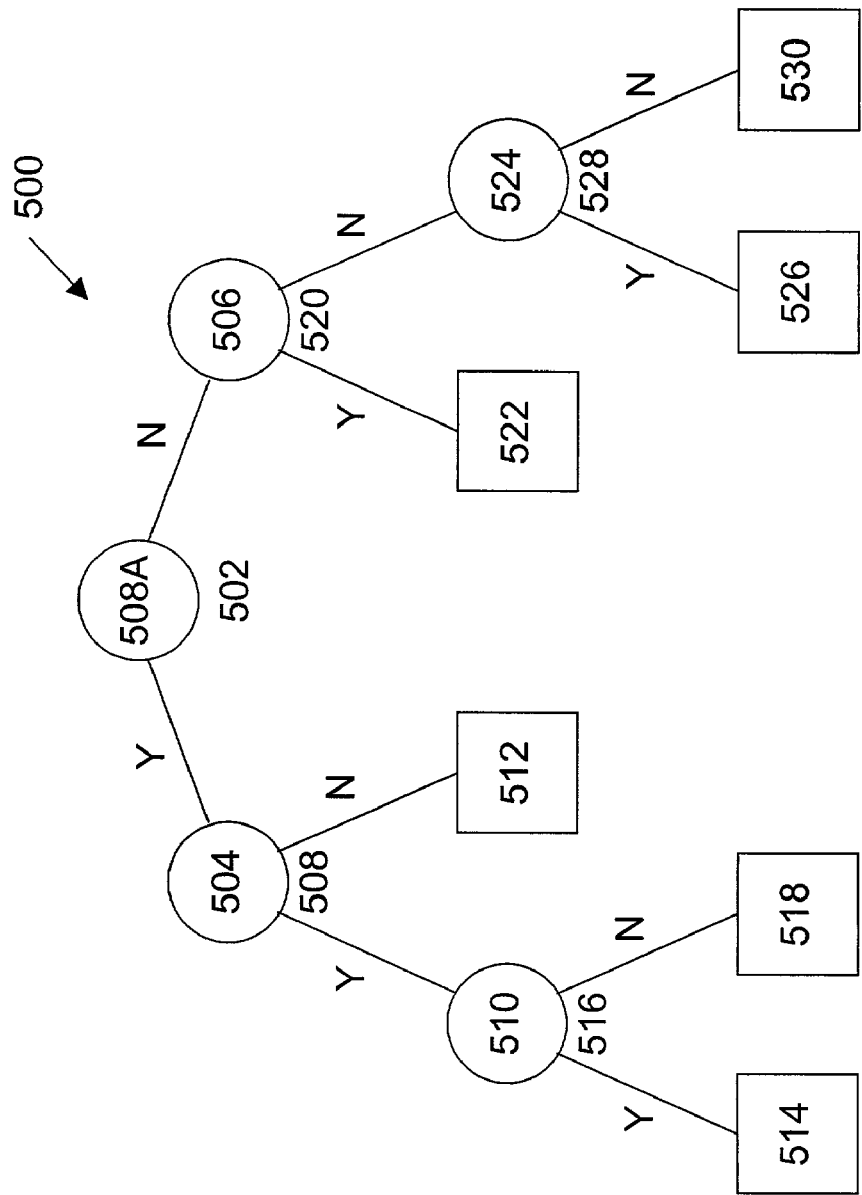
FIG. 5 is an example of an interpreted tree generated by the process shown in FIG. 3.

An exemplary interpreted tree 500 is shown in FIG. 5. Tree 500 is an example of the output of the process shown in FIG. 3. In this example, dataset 501 is the root node. Dataset 501 is partitioned into two subsets (in a binary tree) based on condition 502. The subset of dataset 501 that meets condition 502 is partitioned into subset 504, while the subset of dataset 501 that does not meet condition 502 is partitioned into subset 506. Likewise, subset 504 is further partitioned based on condition 508. Subset 510 meets condition 508, while subset 512 does not. Subset 512 is a terminal node of the tree, that is, it is not partitioned further. Subset 510 is partitioned further, into subset 514, which meets condition 516, and subset 518, which does not meet condition 516. Both subset 514 and 518 are terminal nodes. Subset 506 is further partitioned based on condition 520. Subset 522 meets condition 520, while subset 524 does not. Subset 522 is a terminal node of the tree, that is, it is not partitioned further. Subset 524 is partitioned further, into subset 526, which meets condition 528, and subset 530, which does not meet condition 528. Both subset 526 and 530 are terminal nodes.

Figure 6:
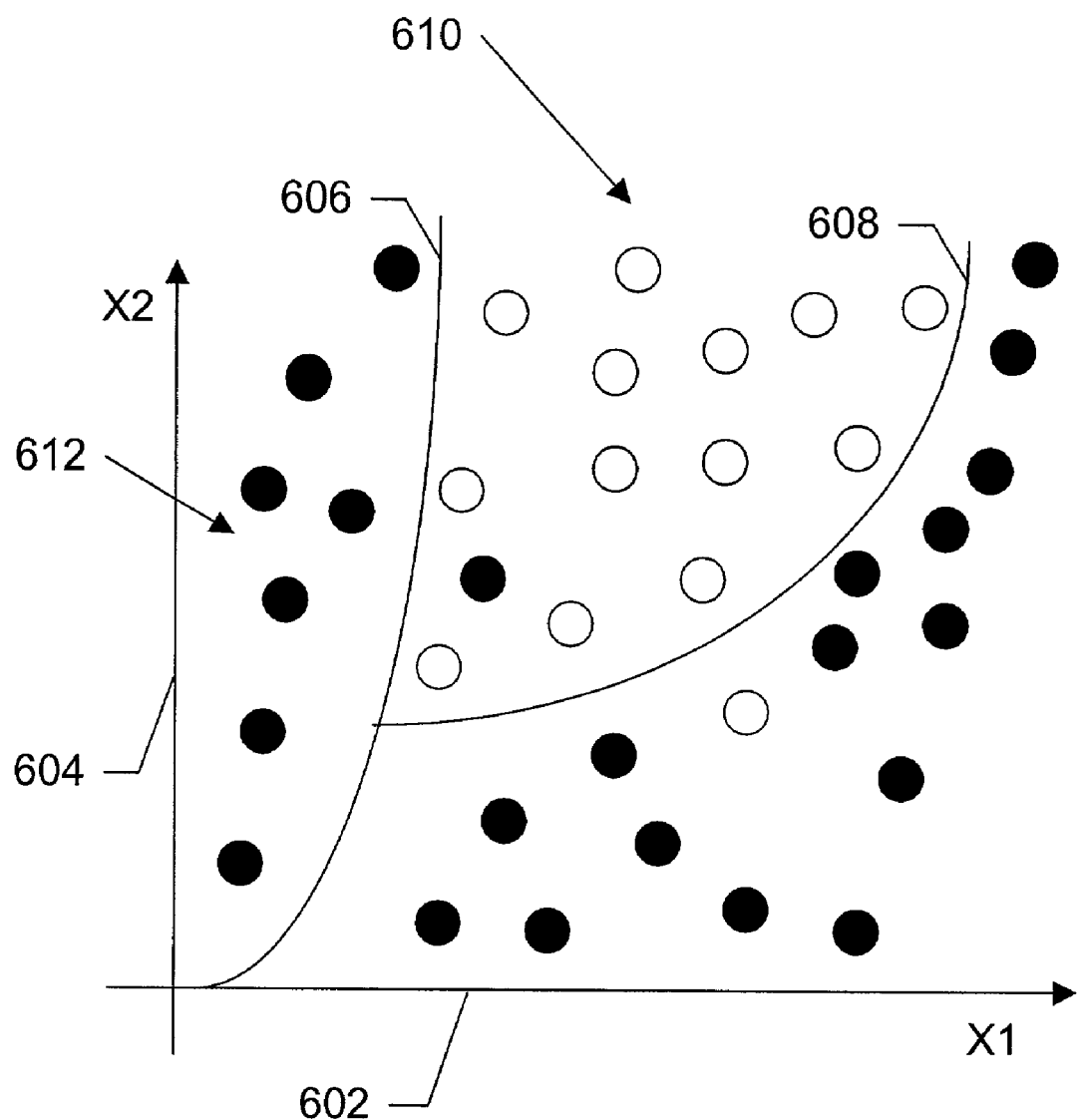
FIG. 6 illustrates an example of the relationship between a data mining model and a tree that represents the data mining model.
Figure 7:
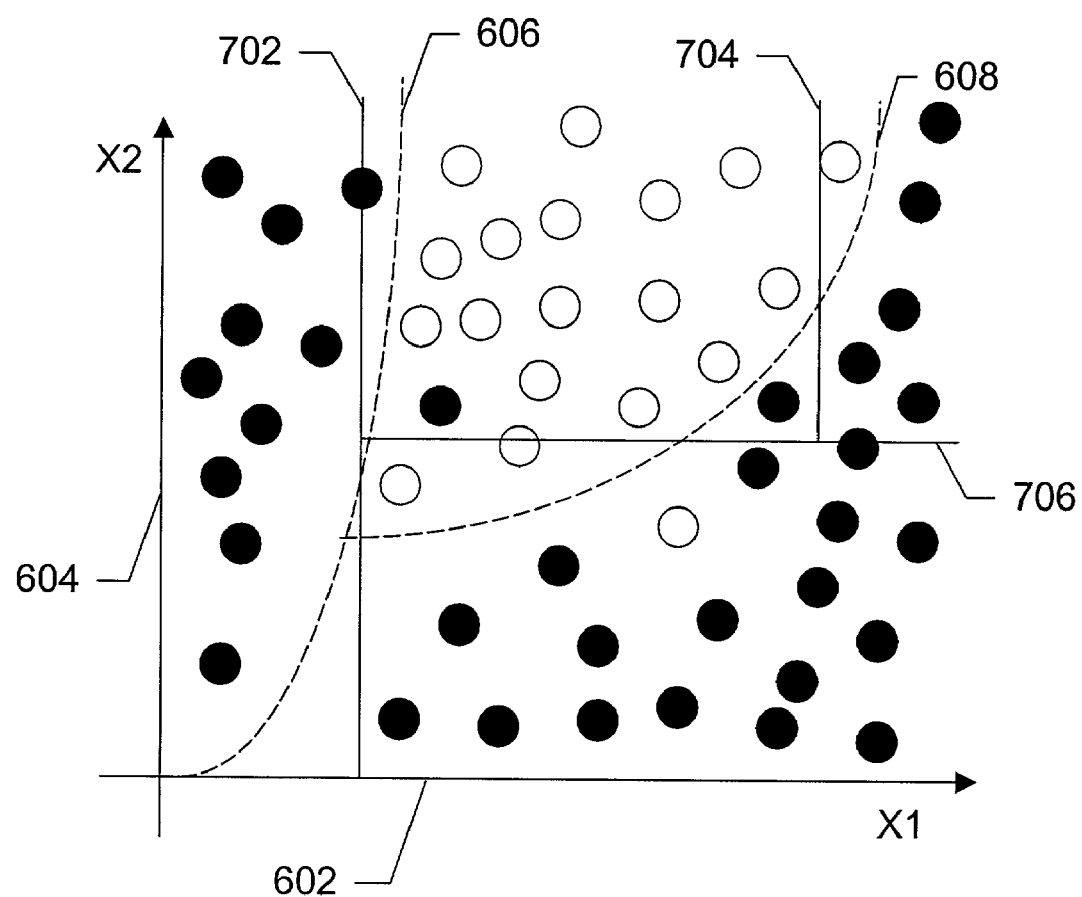
FIG. 7 illustrates an example of the relationship between a data mining model and a tree that represents the data mining model.

An example of the relationship between a data mining model and a tree that represents the data mining model is shown in FIGS. 6 and 7. In FIG. 6, an exemplary dataset is plotted relative to two axes 602 and 604. Decision boundaries, such as decision boundaries 606 and 608, represent decision boundaries within the dataset. The decision boundaries represent decisions included in a data mining model and represent decisions made by the data mining model relative to the dataset. Within the decision boundaries, data classes are formed. For example, data class 608 is formed by decision boundary 606 and data class 610 is formed by decision boundaries 606 and 608.

In FIG. 7, an example of the decision boundaries of the tree model that represents the data mining model used in FIG. 6 is shown. An exemplary dataset, which includes the original dataset, shown in FIG. 6, and additional data that was created by the process that generated the tree model, are plotted relative to the axes 602 and 604. The decision boundaries of the data mining model, decision boundaries 606 and 608 are shown relative to the original dataset and the created data. Decision boundaries of the tree model, which represent the decision boundaries of the data mining model, are also shown. For example, decision boundaries 702, 704, and 706 together represent decision boundaries 606 and 608. The decision boundaries of the tree model represent the decision boundaries of the data mining model from which the tree model was generated. Thus, the tree model is a representation of the data mining model.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such as floppy disc, a hard disk drive, RAM, and CD-ROM's, as well as transmission-type media, such as digital and analog communications links.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A computer-implemented method of transforming a dataset to form a representation of a data mining model comprising the steps of:
   receiving the dataset;
   generating a callable version of the data mining model by encapsulating the data mining model in a callable wrapper that allows the data mining model to be directly called from other program code; and
   generating a tree representing decisional logic of the data mining model using the dataset.

2. The computer-implemented method of claim 1, wherein the generating step comprises the steps of:
   creating a split and a node using output of the callable version of the data mining model on the dataset and on created data; and
   for each node, repeating the step of creating a split and a node while there is at least a minimum number of data points of the dataset in the node.

3. The computer-implemented method of claim 2, wherein the creating step comprises the steps of:
   creating new data points based on a distribution of data in the dataset;
   determining class membership for the created data points using the callable version of the data mining model;
   determining a split location;
   refining the split location; and
   performing the split at the refined split location.

4. The computer-implemented method of claim 3, wherein the step of determining class membership for the created data points comprises the step of:
   for each created datapoint, scoring the datapoint with the callable version of the model.

5. The computer-implemented method of claim 4, wherein the step of determining a split location comprises the step of:
   looping over variables associated with both the dataset and the created data point and computing a splitting index.

6. The computer-implemented method of claim 5, wherein the splitting index is a Gini index.

7. The computer-implemented method of claim 3, wherein the representation of decisional logic of the data mining model comprises a decision tree.

8. The computer-implemented method of claim 3, wherein the decision tree comprises a classification tree.

9. A computer program product for generating a representation of a data mining model process in an electronic data processing system, comprising:
   a computer readable medium;
   computer program instructions, recorded on the computer readable medium, executable by a processor, for performing the steps of:
   receiving a dataset;
   generating a callable version of the data mining model; and
   generating a tree representing decisional logic of the data mining model using the dataset.

10. The computer program product of claim 9, wherein the generating step comprises the steps of:
    creating a split and a node using output of the callable version of the data mining model on the dataset and on created data; and
    for each node, repeating the step of creating a split and a node while there is at least a minimum number of data points of the dataset in the node.

11. The computer program product of claim 10, wherein the creating step comprises the steps of:
    creating new data points based on a distribution of data in the dataset;
    determining class membership for the created data points using the callable version of the data mining model;
    determining a split location;
    refining the split location; and
    performing the split at the refined split location.

12. The computer program product of claim 11, wherein the step of determining class membership for the created data points comprises the step of:
    for each created datapoint, scoring the datapoint with the callable version of the model.

13. The computer program product of claim 12, wherein the step of determining a split location comprises the step of:
    looping over variables associated with both the dataset and the created data point and computing a splitting index.

14. The computer program product of claim 13, wherein the splitting index is a Gini index.

15. The computer program product of claim 11, wherein the representation of decisional logic of the data mining model comprises a decision tree.

16. The computer program product of claim 11, wherein the decision tree comprises a classification tree.

17. A system for generating a representation of a data mining model, comprising:
    a processor operable to execute computer program instructions; and
    a memory operable to store computer program instructions executable by the processor, for performing the steps of:
    receiving a dataset;
    generating a callable version of the data mining model; and
    generating a tree representing decisional logic of the data mining model using the dataset.

18. The system of claim 17, wherein the generating step comprises the steps of:
    creating a split and a node using output of the callable version of the data mining model on the dataset and on created data; and
    for each node, repeating the step of creating a split and a node while there is at least a minimum number of data points of the dataset in the node.

19. The system of claim 18, wherein the creating step comprises the steps of:
    creating new data points based on a distribution of data in the dataset;
    determining class membership for the created data points using the callable version of the data mining model;
    determining a split location;
    refining the split location; and
    performing the split at the refined split location.

20. The system of claim 19, wherein the step of determining class membership for the created data points comprises the step of:

for each created datapoint, scoring the datapoint with the callable version of the model.

21. The system of claim 20, wherein the step of determining a split location comprises the step of:

looping over variables associated with both the dataset and the created data point and computing a splitting index.

22. The system of claim 21, wherein the splitting index is a Gini index.

23. The system of claim 19, wherein the representation of decisional logic of the data mining model comprises a decision tree.

24. The system of claim 19, wherein the decision tree comprises a classification tree.

* * * * *